(12) United States Patent
Geng et al.

(10) Patent No.: US 11,719,876 B2
(45) Date of Patent: *Aug. 8, 2023

(54) DISPLAY ILLUMINATION USING A WEDGE WAVEGUIDE

(71) Applicant: META PLATFORMS TECHNOLOGIES, LLC, Menlo Park, CA (US)

(72) Inventors: Ying Geng, Bothell, WA (US); Adrian Travis, Paris (FR); Gang Li, Bothell, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,282

(22) Filed: Apr. 14, 2022

(65) Prior Publication Data

US 2022/0244450 A1 Aug. 4, 2022

Related U.S. Application Data

(63) Continuation of application No. 15/930,318, filed on May 12, 2020, now Pat. No. 11,307,347.
(Continued)

(51) Int. Cl.
*F21V 8/00* (2006.01)
*G02B 5/32* (2006.01)
*G02B 27/01* (2006.01)

(52) U.S. Cl.
CPC ............ *G02B 6/0061* (2013.01); *G02B 5/32* (2013.01); *G02B 6/0046* (2013.01);
(Continued)

(58) Field of Classification Search
CPC ............................ G02B 6/0046; G02B 6/0048
See application file for complete search history.

(56) References Cited

U.S. PATENT DOCUMENTS

| 5,797,668 A | 8/1998 | Kojima et al. |
| 5,896,232 A | 4/1999 | Budd et al. |

(Continued)

FOREIGN PATENT DOCUMENTS

| EP | 1358765 A1 | 11/2003 |
| JP | H1196819 A | 4/1999 |

(Continued)

OTHER PUBLICATIONS

Aye T.M., et al., "Compact HMD Optics Based on Multiplexed Aberration-Compensated Holographic Optical Elements," Proceedings of SPIE, Event: Aerospace/Defense Sensing, Simulation, and Controls, Orlando, FL, Aug. 22, 2001, vol. 4361, pp. 88-97.

(Continued)

*Primary Examiner* — Sean P Gramling
(74) *Attorney, Agent, or Firm* — Morgan, Lewis & Bockius LLP

(57) ABSTRACT

A device for illuminating a spatial light modulator includes a light source and an optical element. The light source is configured to provide illumination light. The optical element has a first surface, a second surface that is distinct from and non-parallel to the first surface, and a third surface that is distinct from and non-parallel to the first surface and the second surface. The optical element is configured to receive the illumination light at the first surface, propagate the illumination light via total internal reflection, and output the illumination light from the third surface. Also disclosed is a method performed by the device.

18 Claims, 12 Drawing Sheets

Related U.S. Application Data

(60) Provisional application No. 62/850,527, filed on May 20, 2019.

(52) U.S. Cl.
CPC ......... *G02B 6/0051* (2013.01); *G02B 6/0068* (2013.01); *G02B 27/0172* (2013.01); *G02B 2027/0174* (2013.01)

(56) References Cited

U.S. PATENT DOCUMENTS

| | | | |
|---|---|---|---|
| 6,104,454 | A | 8/2000 | Hiyama et al. |
| 6,829,095 | B2 | 12/2004 | Amitai |
| 7,175,332 | B2 | 2/2007 | Tang |
| 7,245,336 | B2 | 7/2007 | Hiyama et al. |
| 7,798,660 | B2 | 9/2010 | Itoh et al. |
| 7,976,208 | B2 | 7/2011 | Travis |
| 8,079,718 | B1 | 12/2011 | Zhai et al. |
| 8,698,713 | B2 | 4/2014 | Hajjar et al. |
| 8,964,298 | B2 | 2/2015 | Haddick et al. |
| 9,225,971 | B2 | 12/2015 | Woodgate et al. |
| 9,557,568 | B1 | 1/2017 | Ouderkirk et al. |
| 10,241,330 | B2 | 3/2019 | Popovich et al. |
| 10,353,210 | B2 | 7/2019 | Wyrwas et al. |
| 11,099,412 | B2 | 8/2021 | Geng et al. |
| 11,119,343 | B2 | 9/2021 | Geng et al. |
| 11,307,347 | B2 | 4/2022 | Geng et al. |
| 2005/0123229 | A1 | 6/2005 | Huck et al. |
| 2007/0024976 | A1 | 2/2007 | Schluchter et al. |
| 2010/0103078 | A1 | 4/2010 | Mukawa et al. |
| 2010/0302803 | A1 | 12/2010 | Bita et al. |
| 2011/0043142 | A1 | 2/2011 | Travis et al. |
| 2011/0187293 | A1 | 8/2011 | Travis |
| 2012/0069031 | A1 | 3/2012 | Bita et al. |
| 2013/0201094 | A1 | 8/2013 | Travis et al. |
| 2014/0160543 | A1 | 6/2014 | Putilin et al. |
| 2014/0267875 | A1 | 9/2014 | Gruhlke et al. |
| 2015/0153503 | A1 | 6/2015 | Leu |
| 2015/0260992 | A1* | 9/2015 | Luttmann .......... G02B 27/0172 359/633 |
| 2016/0033698 | A1 | 2/2016 | Escuti et al. |
| 2016/0209576 | A1 | 7/2016 | Robinson et al. |
| 2017/0052377 | A1 | 2/2017 | Amitai |
| 2017/0115487 | A1* | 4/2017 | Travis .................. G03H 1/0256 |
| 2017/0285347 | A1 | 10/2017 | Cai et al. |
| 2018/0039082 | A1 | 2/2018 | Amitai |
| 2018/0081177 | A1 | 3/2018 | Yoshida et al. |
| 2018/0088325 | A1 | 3/2018 | Brown et al. |
| 2018/0335629 | A1 | 11/2018 | Cheng et al. |
| 2018/0364482 | A1 | 12/2018 | Georgiou et al. |
| 2019/0018245 | A1 | 1/2019 | Cheng et al. |
| 2019/0041642 | A1 | 2/2019 | Haddick et al. |
| 2019/0060602 | A1 | 2/2019 | Tran et al. |
| 2019/0072767 | A1 | 3/2019 | Vallius et al. |
| 2019/0212573 | A1 | 7/2019 | Popovich et al. |
| 2019/0361163 | A1* | 11/2019 | Ayres .................. G02B 27/283 |
| 2019/0369403 | A1 | 12/2019 | Leister |
| 2020/0096816 | A1 | 3/2020 | Lee et al. |
| 2020/0209667 | A1 | 7/2020 | Sharlin et al. |
| 2020/0310024 | A1 | 10/2020 | Danziger et al. |
| 2020/0310537 | A1 | 10/2020 | Simmons |
| 2020/0371280 | A1 | 11/2020 | Geng et al. |
| 2020/0371387 | A1 | 11/2020 | Gollier et al. |
| 2020/0371388 | A1 | 11/2020 | Geng et al. |
| 2020/0371389 | A1 | 11/2020 | Geng et al. |
| 2021/0033862 | A1 | 2/2021 | Danziger et al. |
| 2021/0072551 | A1 | 3/2021 | Gollier et al. |
| 2022/0035089 | A1 | 2/2022 | Arazi et al. |

FOREIGN PATENT DOCUMENTS

| | | | |
|---|---|---|---|
| WO | 0151849 | A1 | 7/2001 |
| WO | 2007062098 | A2 | 5/2007 |
| WO | 2010137263 | A1 | 12/2010 |
| WO | 2018146326 | A2 | 8/2018 |
| WO | 2018175649 | A1 | 9/2018 |
| WO | 2018175653 | A1 | 9/2018 |

OTHER PUBLICATIONS

Final Office Action dated May 19, 2021 for U.S. Appl. No. 15/930,318, filed May 12, 2020, 12 Pages.
International Search Report and Written Opinion for International Application No. PCT/US2020/033515, dated Aug. 17, 2020, 10 Pages.
International Search Report and Written Opinion for International Application No. PCT/US2020/033688, dated Oct. 29, 15 Pages.
International Search Report and Written Opinion for International Application No. PCT/US2020/046576, dated Nov. 12, 2020, 9 Pages.
International Search Report and Written Opinion for International Application No. PCT/US2020/047281, dated Nov. 9, 2020, 9 Pages.
Invitation to Pay Additional Fees for International Application No. PCT/US2020/033688, Sep. 8, 2020, 13 pages.
Large M.J., et al., "Parallel Optics in Waveguide Displays: A Flat Panel Autostereoscopic Display," Journal of Display Technology, IEEE Service Center, New York Ny, US, Oct. 1, 2010, vol. 6 (10), XP011311965, pp. 431-437.
Margarinos., et al., "Wide Angle, Color, Hologrpahic Infinity Optics Display-Final Report," Farrand Optical Co., Valhalla, NY, Rort No. AFHRL-TR-80-53, Mar. 1981, 93 pages, retrieved from internet: URL: https://files.eric.ed.gov/fulltext/ED202467.pdf.
Moller C., et al., "Flat Panel Time Multiplexed Autostereoscopic Display Using an Optical Wedge Waveguide," IDW.3D2-1, London UK, Jan. 1, 2004, XP007013996, pp. 1443-1446.
Non-Final Office Action dated Apr. 18, 2022 for U.S. Appl. No. 16/862,396, filed Apr. 29, 2020, 16 pages.
Non-Final Office Action dated Sep. 3, 2021 for U.S. Appl. No. 15/930,318, filed May 12, 2020, 13 Pages.
Non-Final Office Action dated Dec. 9, 2020 for U.S. Appl. No. 15/930,318, filed May 12, 2020, 9 pages.
Non-Final Office Action dated Feb. 11, 2022 for U.S. Appl. No. 17/393,396, filed Aug. 3, 2021, 10 pages.
Non-Final Office Action dated Dec. 16, 2020 for U.S. Appl. No. 16/862,399, filed Apr. 29, 2020, 9 pages.
Non-Final Office Action dated May 25, 2022 for U.S. Appl. No. 16/862,403, filed Apr. 29, 2020, 29 pages.
Notice of Allowance dated May 3, 2021 for U.S. Appl. No. 16/862,399, filed Apr. 29, 2020, 7 pages.
Notice of Allowance dated Mar. 11, 2022 for U.S. Appl. No. 16/799,607, filed Feb. 24, 2020, 21 pages.
Notice of Allowance dated Dec. 14, 2021 for U.S. Appl. No. 15/930,318, filed May 12, 2020, 11 pages.
Notice of Allowance dated Mar. 31, 2021 for U.S. Appl. No. 16/862,401, filed Apr. 29, 2020, 12 pages.
Final Office Action dated Oct. 20, 2022 for U.S. Appl. No. 16/862,403, filed Apr. 29, 2020, 24 pages.
Final Office Action dated Apr. 21, 2022 for U.S. Appl. No. 16/810,471, filed Mar. 5, 2020, 24 pages.
Final Office Action dated Aug. 29, 2022 for U.S. Appl. No. 16/862,396, filed Apr. 29, 2020, 17 pages.
Fukui K., et al., Machine Translation of JP1196819A, Apr. 1999, 16 pages.
Non-Final Office Action dated Mar. 30, 2022 for U.S. Appl. No. 16/734,163, filed Jan. 3, 2020, 14 pages.
Notice of Allowance dated May 12, 2022 for U.S. Appl. No. 17/241,921, filed Apr. 27, 2021, 7 pages.
Notice of Allowance dated Apr. 15, 2022 for U.S. Appl. No. 16/810,431, filed Mar. 5, 2020, 10 pages.
Notice of Allowance dated Jul. 22, 2022 for U.S. Appl. No. 17/393,396, filed Aug. 3, 2021, 8 pages.
Notice of Allowance dated May 24, 2022 for U.S. Appl. No. 16/734,167, filed Jan. 3, 2020, 8 pages.
Notice of Allowance dated Apr. 26, 2022 for U.S. Appl. No. 16/810,431, filed Mar. 5, 2020, 04 pages.

(56) References Cited

OTHER PUBLICATIONS

Notice of Allowance dated Jun. 29, 2022 for U.S. Appl. No. 17/393,396, filed Aug. 3, 2021, 7 pages.
Non-Final Office Action dated Dec. 20, 2022 for U.S. Appl. No. 16/862,396, filed Apr. 29, 2020, 17 pages.
Notice of Allowance dated Mar. 6, 2023 for U.S. Appl. No. 16/862,403, filed Apr. 29, 2020, 12 pages.

* cited by examiner

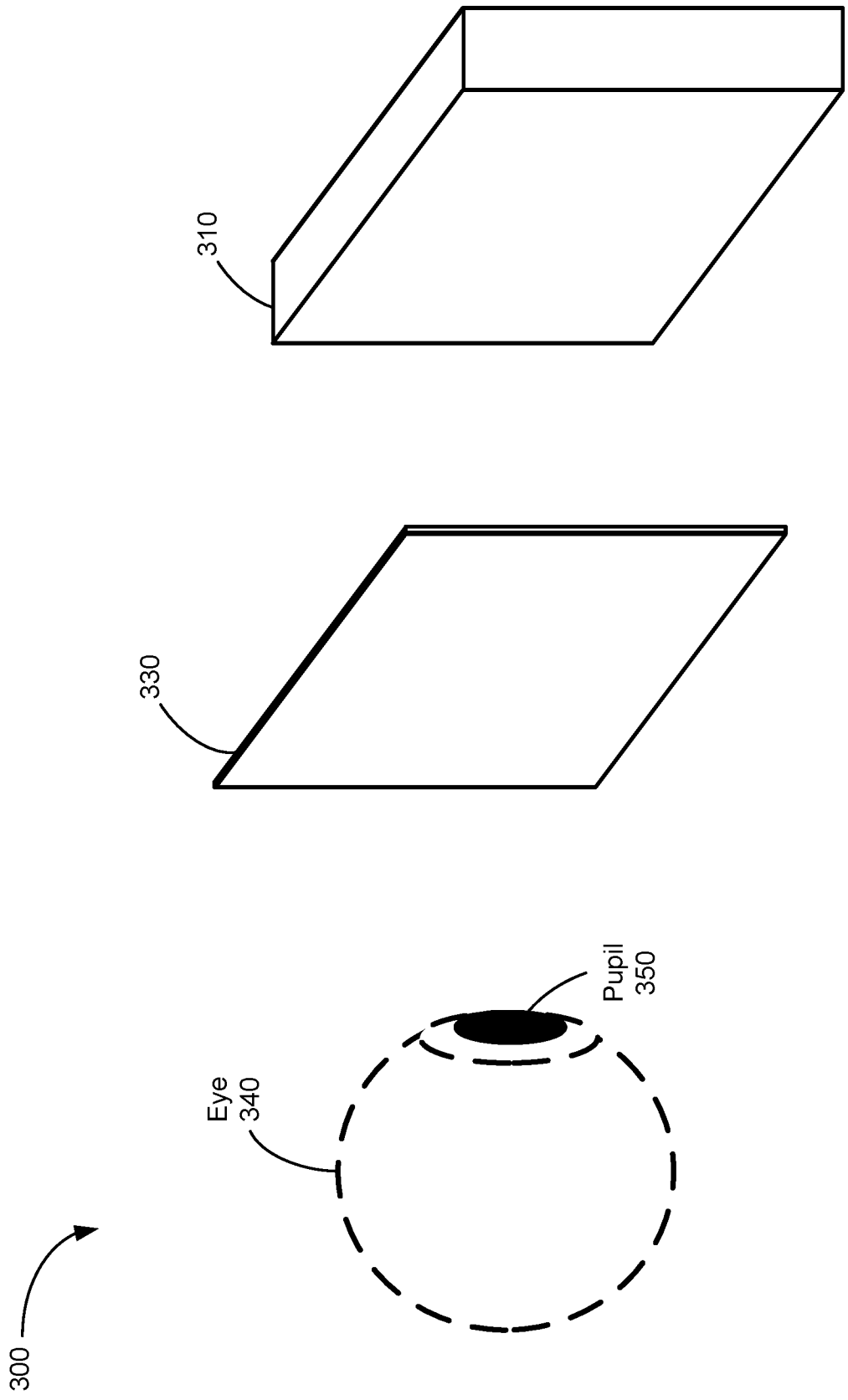

600

610 Provide illumination light from a light source.

612 The light source includes a plurality of light emitting elements. Activate a subset, less than all, of the plurality of light emitting elements.

620 Receive the illumination light at a first surface of an optical element. The optical element also includes a second surface that is distinct from and non-parallel to the first surface, and a third surface that is distinct from and non-parallel to the first surface and the second surface.

630 Propagate the illumination light in the optical element via total internal reflection.

640 Output the illumination light from the third surface of the optical element for illuminating a spatial light modulator.

DISPLAY ILLUMINATION USING A WEDGE WAVEGUIDE

RELATED APPLICATIONS

This application is a continuation application of U.S. patent application Ser. No. 15/930,318, filed May 12, 2020, which claims the benefit of, and priority to, U.S. Provisional Patent Application Ser. No. 62/850,527, filed May 20, 2019, both of which are incorporated by reference herein in their entireties.

TECHNICAL FIELD

This relates generally to display devices, and more specifically to illuminators for use in head-mounted display devices.

BACKGROUND

Head-mounted display devices (also called herein head-mounted displays) are gaining popularity as means for providing visual information to a user. For example, the head-mounted display devices are used for virtual reality and augmented reality operations.

Light, compact, and energy-efficient displays are desired in head-mounted display devices in order to improve a user experience with virtual reality and augmented reality operations. Additionally, uniform illumination light is desired in order to provide users with high quality images.

SUMMARY

Accordingly, there is a need for compact and lightweight head-mounted display devices with high quality images. Such head-mounted display devices will enhance user experience with virtual reality and/or augmented reality operations.

The above deficiencies and other problems associated with conventional head-mounted displays are reduced or eliminated by the disclosed optical components and display devices.

In accordance with some embodiments, an optical device for illuminating a spatial light modulator includes a light source and an optical element. The light source is configured to provide illumination light. The optical element has a first surface, a second surface that is distinct from and non-parallel to the first surface, and a third surface that is distinct from and non-parallel to the first surface and the second surface. The optical element is configured to receive the illumination light provided by the light source at the first surface, propagate the illumination light via total internal reflection, and output the illumination light.

In accordance with some embodiments, a display device includes a spatial light modulator and any optical device described herein, for illuminating the spatial light modulator.

In accordance with some embodiments, a method includes providing illumination light from a light source, and receiving illumination light at a first surface of an optical element. The optical element also has a second surface that is distinct from and non-parallel to the first surface, and a third surface that is distinct from and non-parallel to the first surface and the second surface. The method further includes propagating the illumination light via total internal reflection in the optical element, and outputting the illumination light from the third surface of the optical element for illuminating a spatial light modulator.

Thus, the disclosed embodiments provide lightweight and compact display devices that provide uniform illumination and high quality images. In some embodiments, the display devices are head-mounted display devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIGS. 6A-6B illustrate a flow diagram illustrating a method of using a wedge waveguide in accordance with some embodiments.

These figures are not drawn to scale unless indicated otherwise.

DETAILED DESCRIPTION

There is a need for head-mounted display devices that are lightweight, compact, and can provide uniform illumination.

The present disclosure provides display devices that include a wedge waveguide configured to direct illumination light emitted from a light source toward a spatial light modulator that outputs image light for delivery to a user's eye. Such display devices have a compact footprint, thereby enabling reduction of the size and weight of display devices. In addition, such display devices provide uniform illumination, thereby improving the image quality when a spatial light modulator is used.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first reflector could be termed a second reflector, and, similarly, a second reflector could be termed a first reflector, without departing from the scope of the various described embodiments. The first reflector and the second reflector are both light reflectors, but they are not the same reflector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
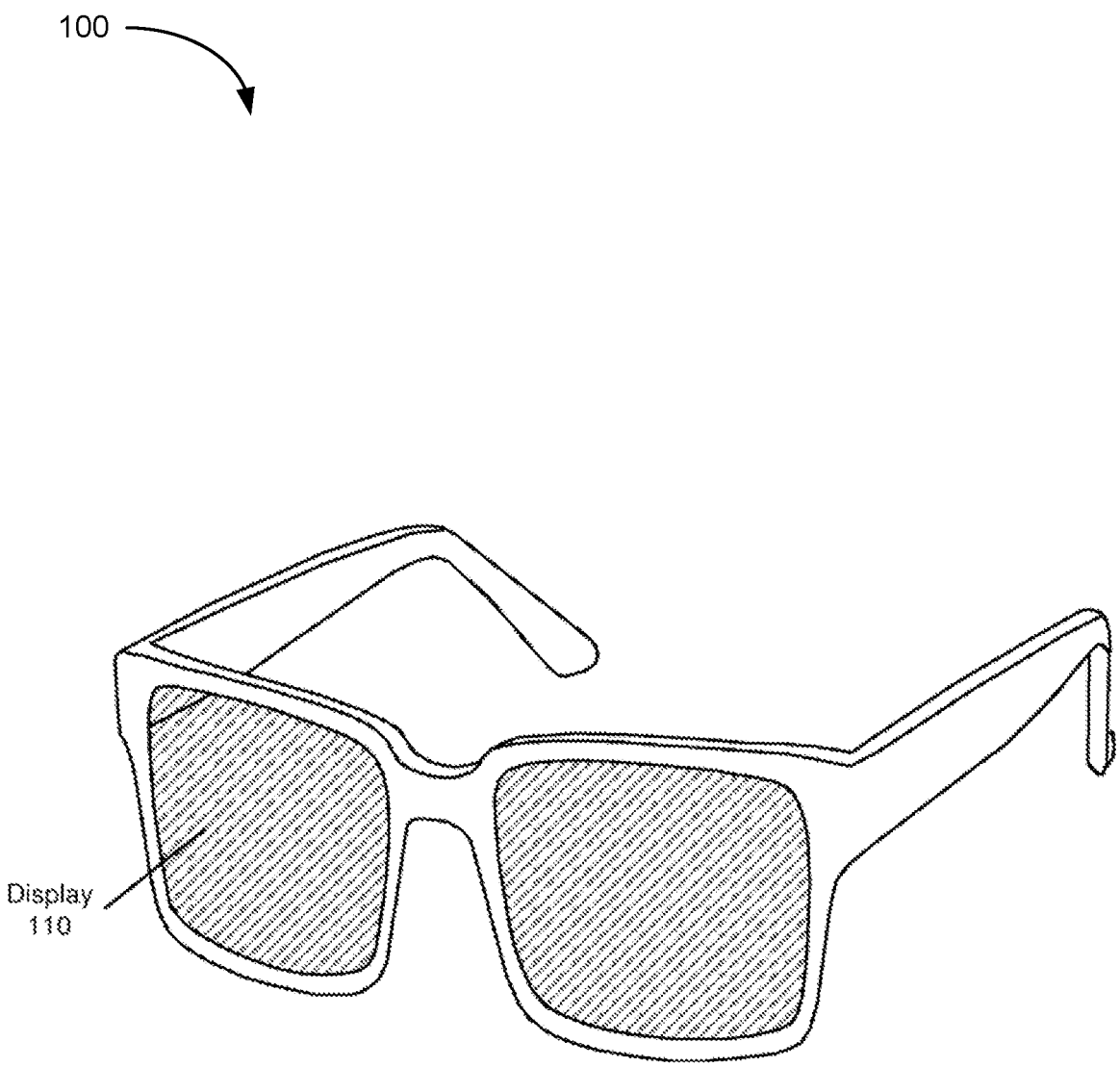
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
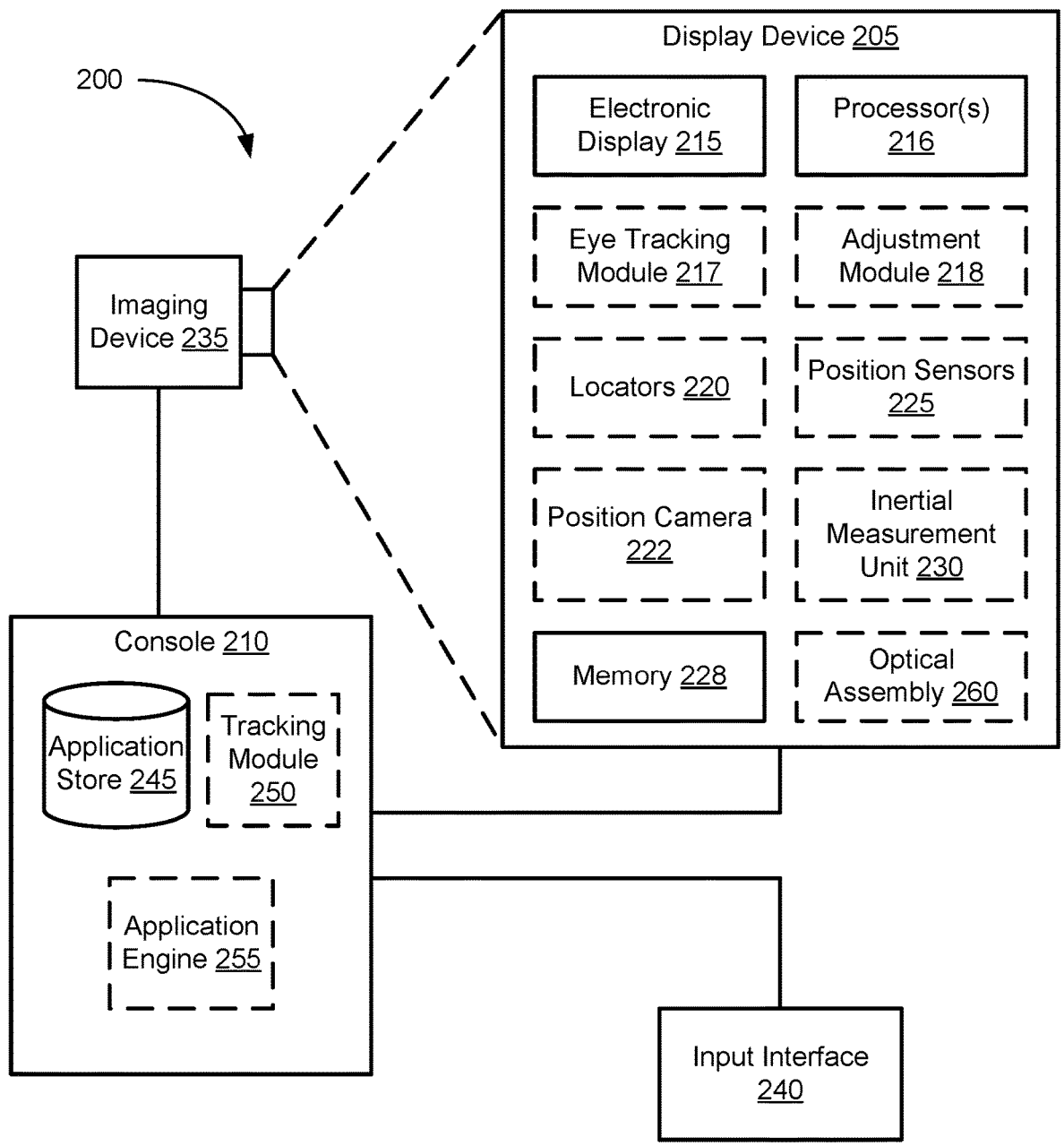
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 corresponds to display device 100 and is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox and ultimately to the back of the user's retina(s). An eyebox is a region that is occupied by an eye of a user of display device 205 (e.g., a user wearing display device 205) who is viewing images from display device 205. In some cases, the eyebox is represented as a 10 mm×10 mm square. In some embodiments, the one or more optical components include one or more coatings, such as anti-reflective coatings, and one or more polarization volume holograms (PVH).

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Additionally or alternatively, the reflection off of the surfaces of the eye is used to also determine location of the pupil. In some cases, the IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps the received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR eye tracking system described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to provide image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260. In some embodiments, display device 205 optionally includes a single optical assembly 260 or multiple optical assemblies 260 (e.g., an optical assembly 260 for each eye of a user). In some embodiments, the one or more optical assemblies 260 receive image light for the computer generated images from the electronic display device(s) 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display device 215 projects computer-generated images to one or more reflective elements (not shown), and the one or more optical assemblies receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device 310 including an emission intensity array make up a display element. Alternatively, the display element includes light emission device 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light so that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

In some embodiments, display device 300 (or light emission device 310 of display device 300) includes a spatial light modulator, such as a Liquid Crystal on Silicon (LCoS) spatial light modulator. In some embodiments, the LCoS spatial light modulator includes liquid crystals. In some embodiments, the LCoS spatial light modulator includes ferroelectric liquid crystals. In some embodiments, the spatial light modulator is a transmissive spatial light modulator. The spatial light modulator has an array of pixels (or subpixels), and a respective pixel (or a respective subpixel) is individually controlled to transmit light impinging thereon (e.g., a pixel is activated to transmit light impinging thereon or deactivated to cease transmitting the light impinging thereon) or modulate the transmitted light (e.g., a pixel is activated to change the polarization of the transmitted light or deactivated to cease changing the polarization of the transmitted light, or vice versa). In some embodiments, the spatial light modulator is a reflective spatial light modulator (e.g., a respective pixel is individually controlled to reflect light impinging thereon or modulate the reflected light). In some embodiments, display device 300 includes multiple spatial light modulators (e.g., a first spatial light modulator for a first color, such as red, a second spatial light modulator for a second color, such as green, and a third spatial light modulator for a third color, such as blue). Such spatial light modulator requires an illuminator that provides light to the spatial light modulator.

Conventional illuminators (e.g., conventional LCoS illuminators) use a single polarizing beam splitter (PBS), which has a height that corresponds to a width of the spatial light modulator (e.g., an LCoS spatial light modulator), for illuminating the LCoS spatial light modulators. For example, the polarizing beam splitter has a shape of a cube. This increases the required volume of the illuminator. In addition, as the LCoS spatial light modulator typically reflects a portion of illumination light to provide image light, non-uniformity in the illumination light will lead to non-uniformity in the image light. Thus, there is a need for compact illuminators that can provide uniform illumination of LCoS spatial light modulators.

FIGS. 4A-4D are schematic diagrams illustrating a display device 400 in accordance with some embodiments. Display device 400 enables compact illumination while improving uniformity in illumination light.

As shown, display device 400 includes a light source 410 (e.g., one or more projectors) and a wedge waveguide 420. The wedge waveguide 420 has a first surface 422, a second surface 424 that is distinct from and non-parallel to the first surface 422, and a third surface 426 that is distinct from and non-parallel to each of the first surface 422 and the second surface 424. The second surface 424 and the first surface 422 form a first angle θ1, and the third surface 426 and the first surface 422 form a second angle θ2 that is distinct from the first angle θ1, thereby forming a wedge-shaped waveguide. In some embodiments, the first angle θ1 is between 0 and 90 degrees. In some embodiments, the first angle θ1 is 30, 35, 40, 45, 50, 55, 60, 65, 70, 75, 80, 85, 86, 87, 88, 89, or 89.9 degrees or within any range between any two of the foregoing angles. In some embodiments, the first angle θ1 is between 0 and 90 degrees. In some embodiments, the second angle θ2 is 30, 35, 40, 45, 50, 55, 60, 65, 70, 75, 80, 85, 86, 87, 88, 89, 90, 91, 92, 93, 94, 95, 100, 110, or 120 degrees or within any range between any two of the foregoing angles. In some embodiments, a sum of the first angle θ1 and the second angle θ2 is less than 180 degrees.

Figure 4A:
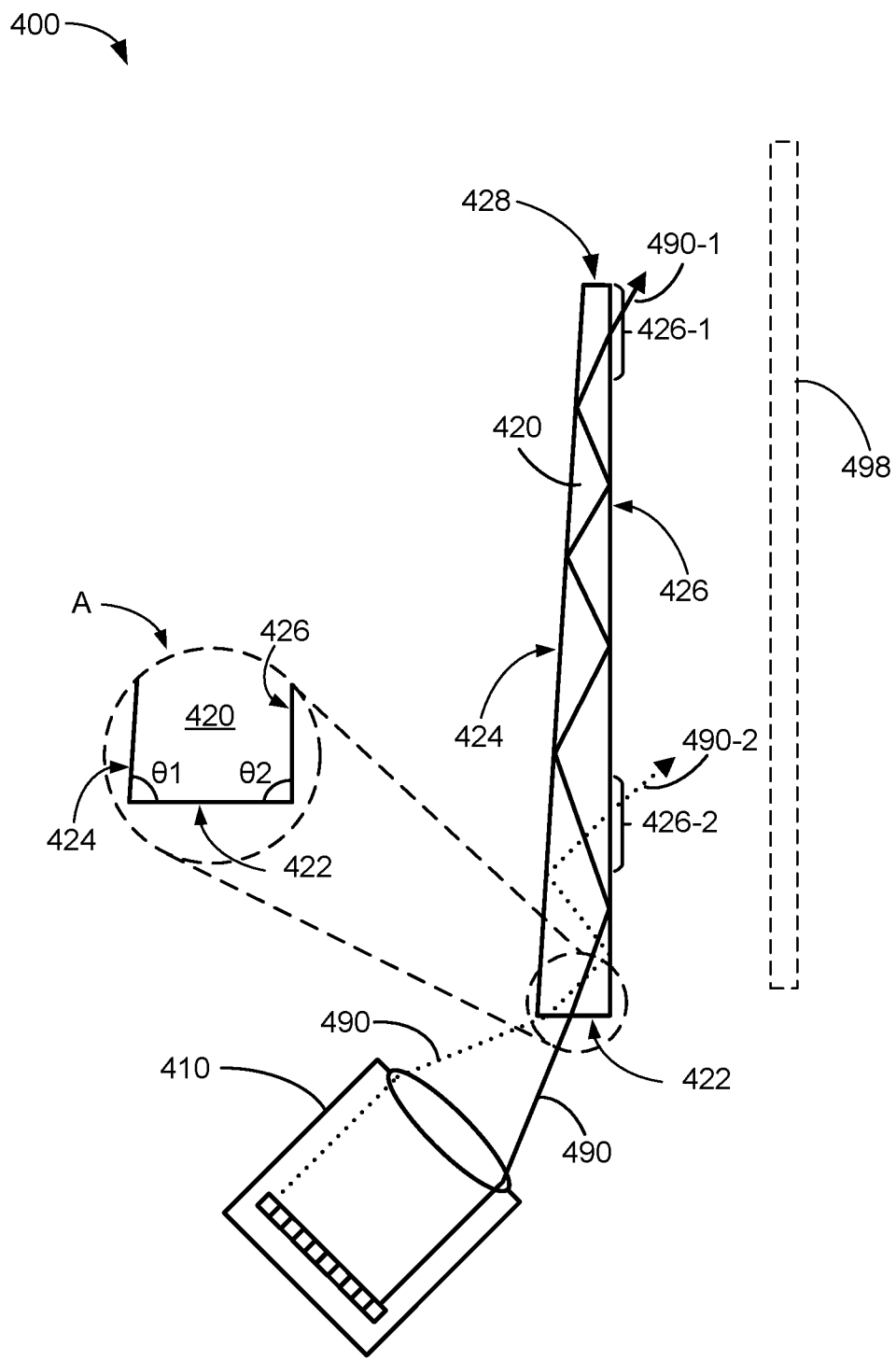
FIG. 4A is a schematic diagram illustrating a display device in accordance with some embodiments.

Any of the first surface 422, the second surface 424, and the third surface 426 may be a planar surface. In some embodiments, each of the first surface 422, the second surface 424 and the third surface 426 is a planar surface. In some embodiments, the second surface 424 is separate from (e.g., not in contact with) the third surface 426. For example, as shown, the wedge waveguide 420 may include a fourth surface 428 that is distinct from each of the first surface 422, the second surface 424, and the third surface 426. The fourth surface 428 is non-parallel to any of the second surface 424 and the third surface 426, and the fourth surface 428 adjoins the second surface 424 and the third surface 426. In some embodiments, the wedge waveguide 420 has a shape of a trapezoidal prism, a cross-section of which is shown in FIG. 4A.

The light source 410 is configured to provide (e.g., output, emit, generate) illumination light 490. In some embodiments, the light source 410 includes, or is coupled with, one or more lenses, which may be used to provide the illumination light 490 with a certain divergence and/or of a certain spot size. The wedge waveguide 420 is configured to receive the illumination light 490 at the first surface 422, propagate the illumination light 490 via total internal reflection (TIR), and output the illumination light 490 from the third surface (for illuminating a spatial light modulator 498, such as a liquid crystal on silicon (LCoS) spatial light modulator). As shown in FIG. 4A, the shape of the wedge waveguide 420 (e.g., the first angle θ1 being distinct from the second angle θ2) allows the illumination light 490 to propagate down the wedge waveguide 420 via TIR until the illumination light 490 is incident upon the third surface 426 at an angle that no longer meets the conditions for TIR (e.g., the illumination light 490 is incident upon the third surface 426 at an angle that is smaller than the critical angle). When a portion of the illumination light 490 is incident upon the third surface 426 at an angle that no longer meets the conditions for TIR, the portion of the illumination light 490 is output (e.g., leaked) from the third surface 426. Thus, the shape of the wedge waveguide 420 allows a first portion 490-1 of the illumination light 490 to be output from a first portion (or a first region) 426-1 of the third surface 426 and a second portion 490-2 of the illumination light 490 to be output from a second portion (or a second region) 426-2 of the third surface 426 that is mutually exclusive to the first portion 426-1 of the third surface 426. Due to the difference between the refractive index of the wedge waveguide 420 (e.g., 1.655 if made with flint glass) and the refractive index of air (e.g., 1.0003), illumination light 490 (including portions 490-1 and 490-2) is refracted as it exits the third surface 426 of the wedge waveguide 420.

Figure 4B:
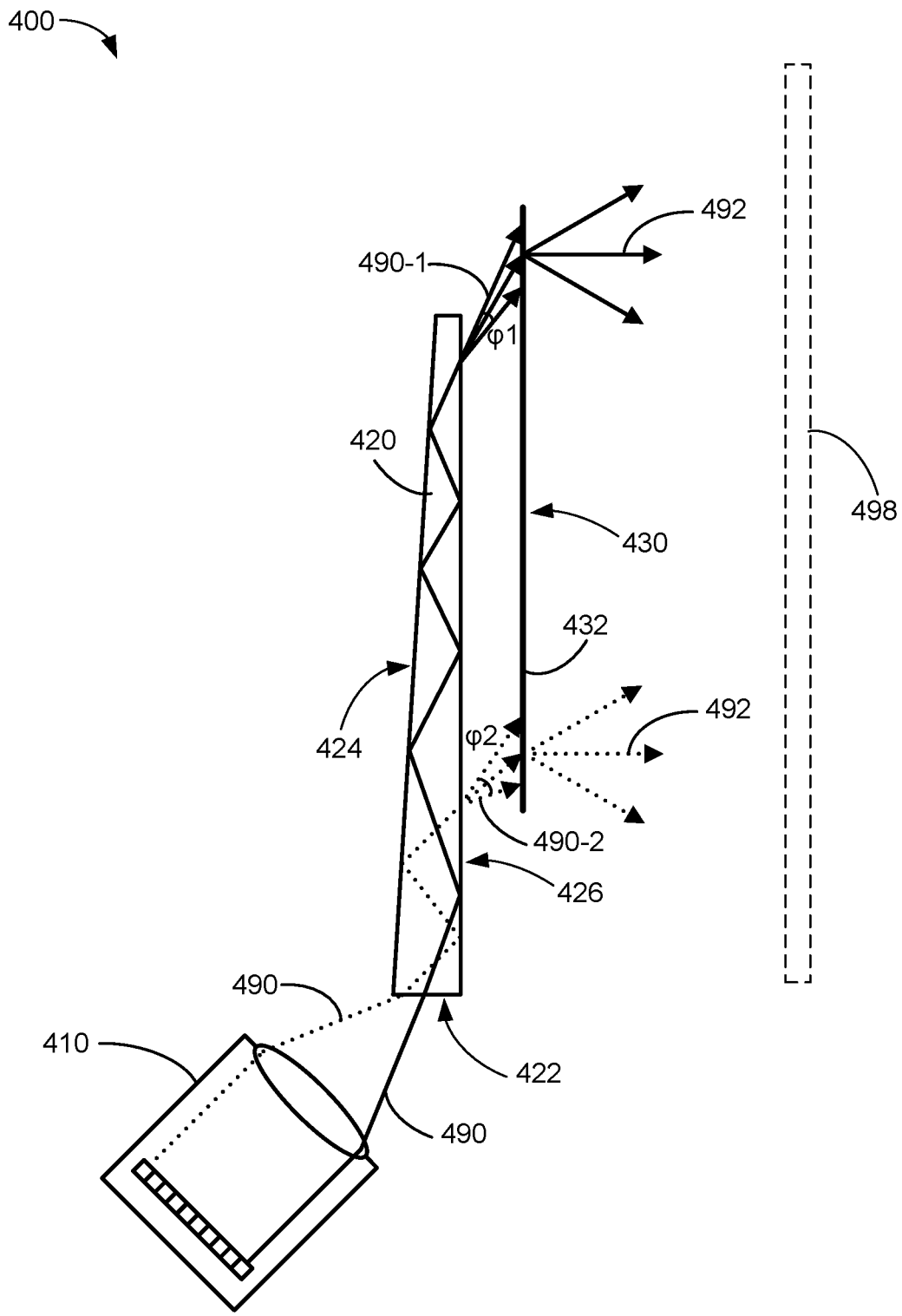
FIG. 4B is a schematic diagram illustrating a display device including an optical diffuser in accordance with some embodiments.
Figure 4C:
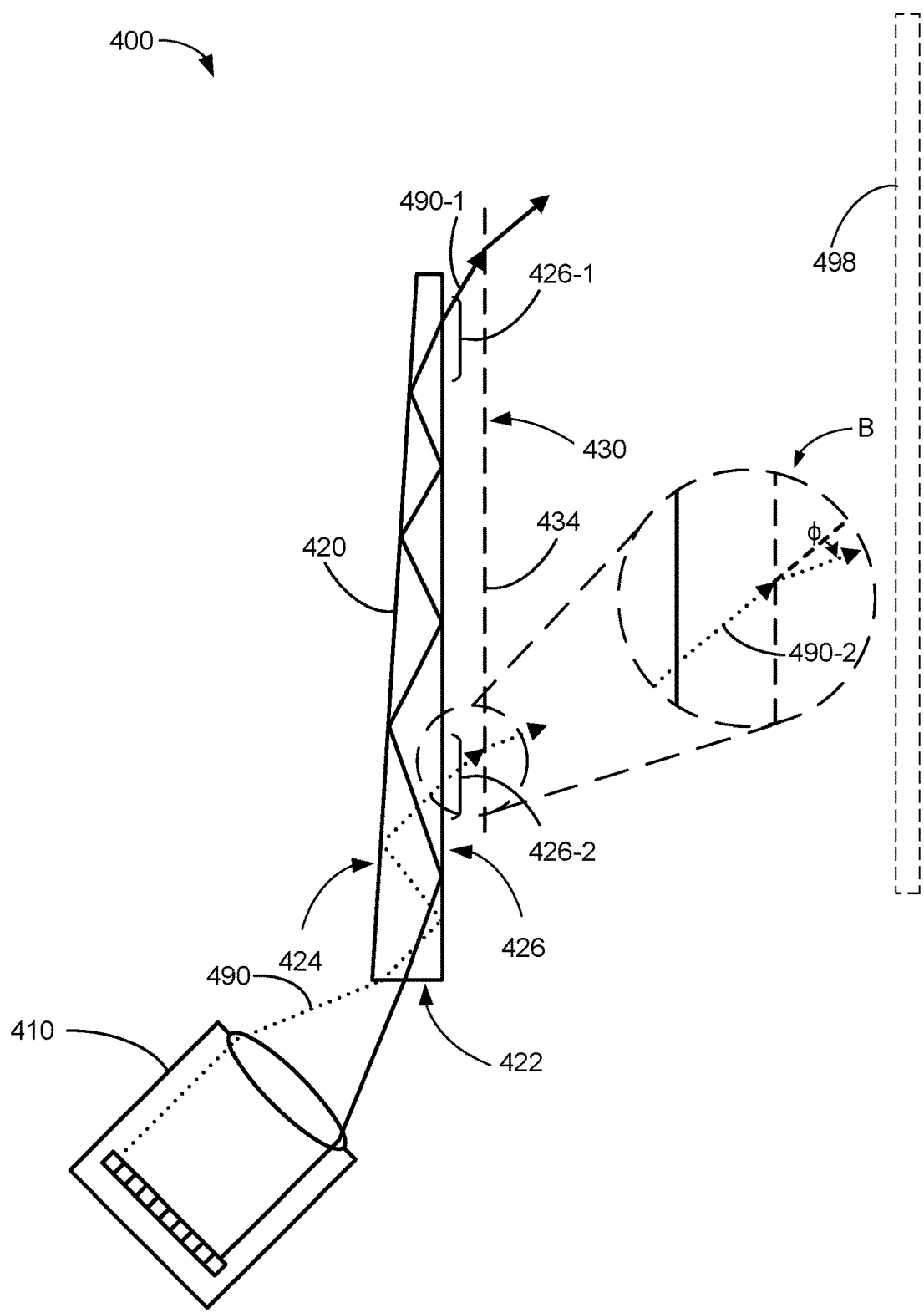
FIG. 4C is a schematic diagram illustrating a display device including a turning film in accordance with some embodiments.
Figure 4D:
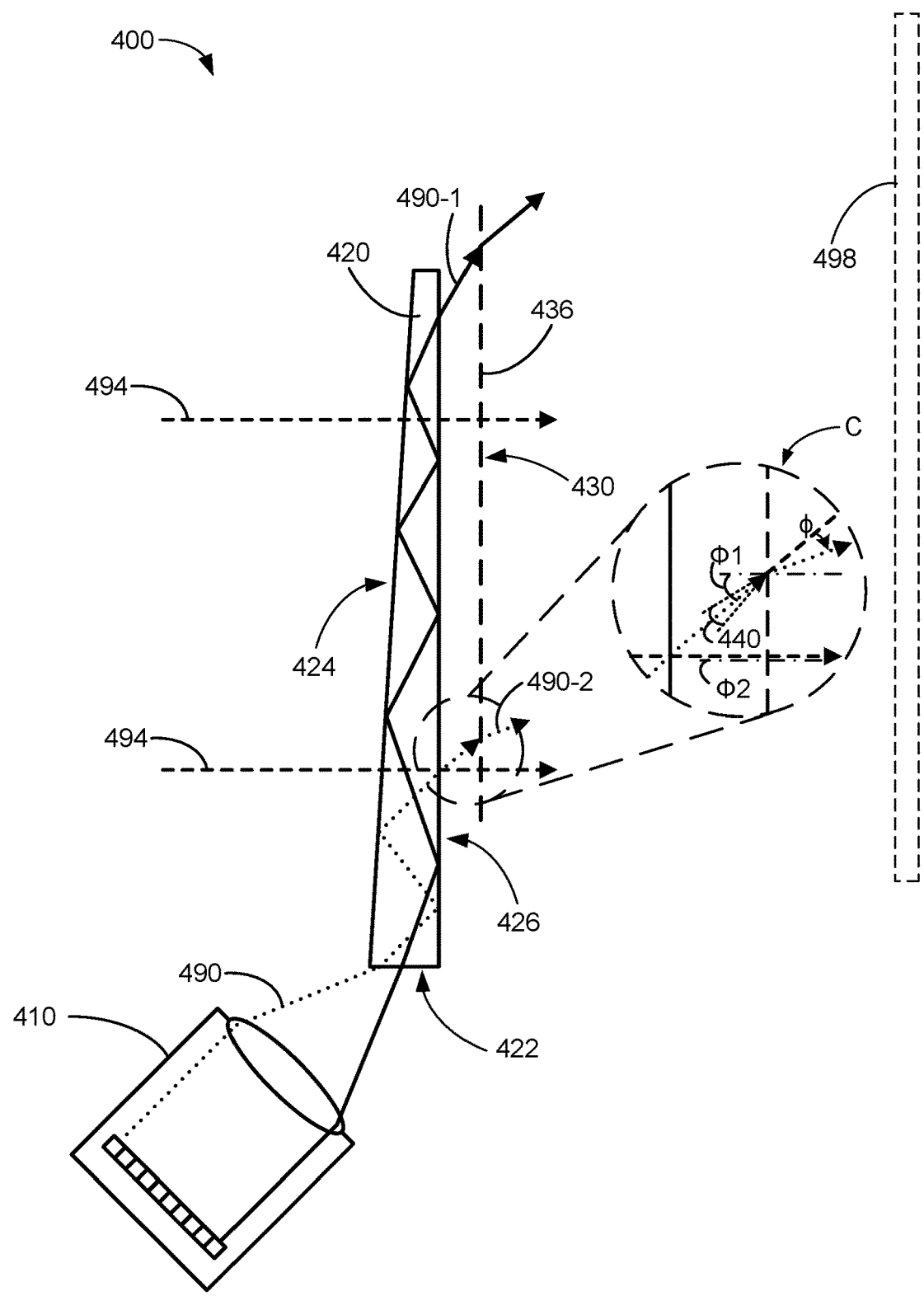
FIG. 4D is a schematic diagram illustrating a display device including a holographic turning film in accordance with some embodiments.

FIGS. 4B-4D illustrate display device 400 that includes different examples of optical assembly 430 in accordance with some embodiments. The optical assembly 430 is shown spaced apart from the third surface 426 of the wedge waveguide 420 in order to illustrate the optical path of illumination light 490 through the display device 400, although in some embodiments, the optical assembly 430 is in contact with the third surface 426 of the wedge waveguide 420 as described below.

Figure 5A:
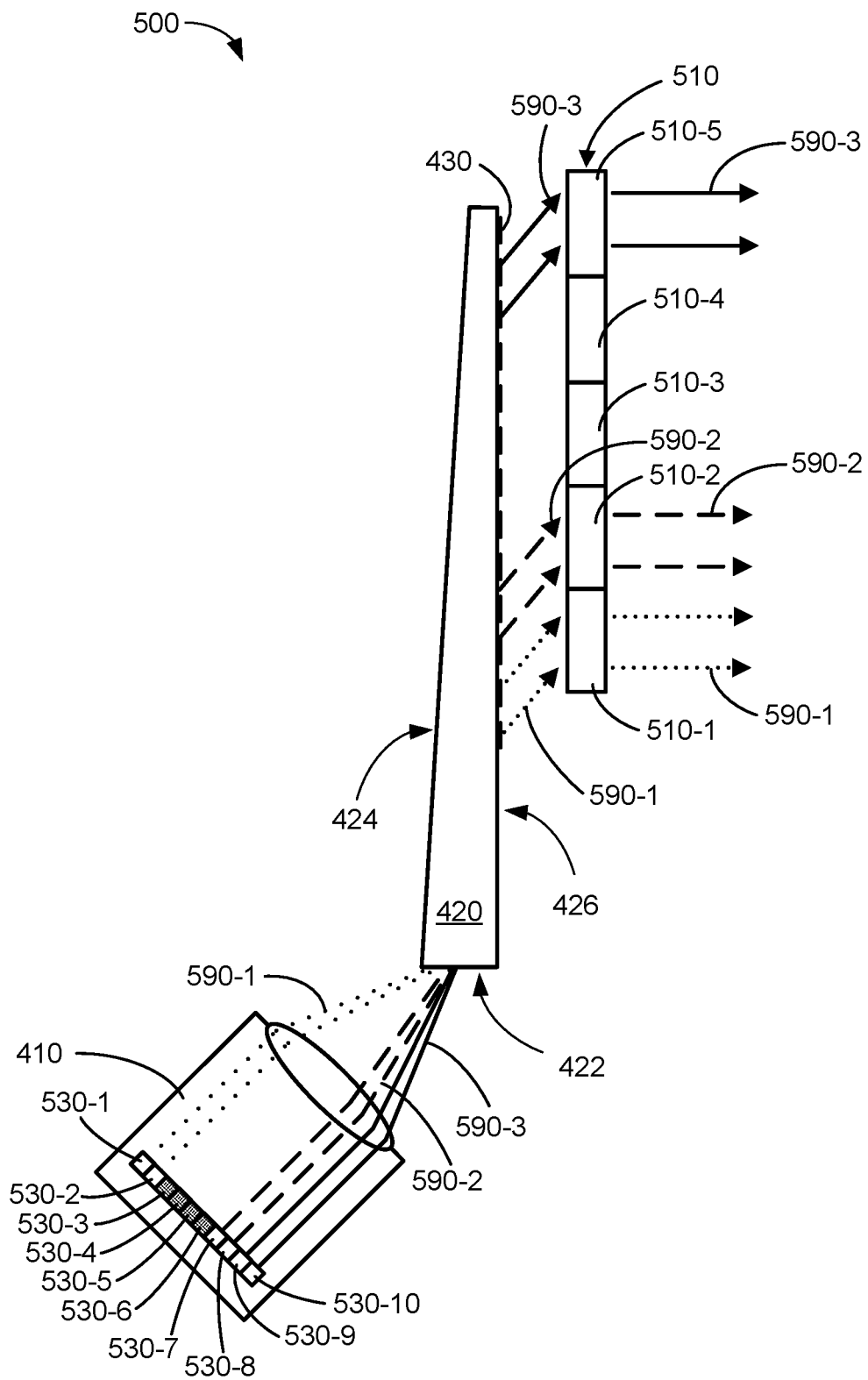
FIGS. 5A-5B are schematic diagrams illustrating a display device including a spatial light modulator in accordance with some embodiments.
Figure 5B:
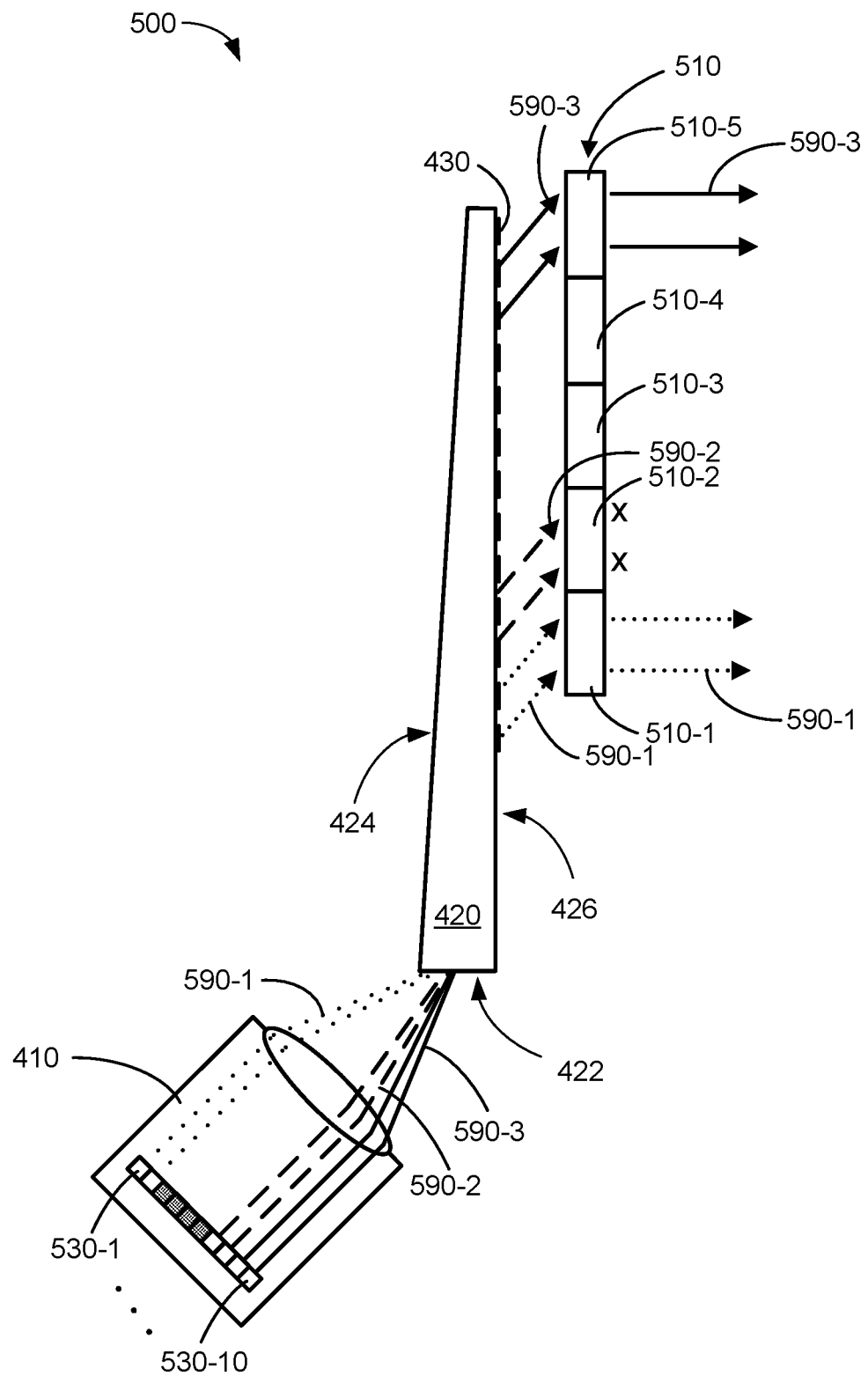

In some embodiments, as shown in FIG. 4B, the display device 400 also includes an optical assembly 430 that is disposed adjacent to the third surface 426 of the wedge waveguide 420. The optical assembly 430 is positioned to (e.g., configured to) receive the illumination light 490 output from the third surface 426 of the wedge waveguide 420 and to redirect (e.g., direct, change a direction) the illumination light 490 (e.g., toward the spatial light modulator 498). The optical assembly 430 may be spaced apart from (e.g., separated from, not in contact with) the third surface 426 of the wedge waveguide 420, as shown in FIGS. 4B-4D, or may be disposed on the third surface 426 of the wedge waveguide 420 (e.g., the third surface 426 may include one or more coatings thereon, such as a diffusive optical coating or a turning film, as shown in FIGS. 5A and 5B).

In some embodiments, as shown in FIG. 4B, the optical assembly 430 includes an optical diffuser 432 that is configured to diffuse the illumination light 490 output from the third surface 426 of the wedge waveguide 420. In some embodiments, the first portion 490-1 of the illumination light 490 output at the first portion 426-1 of the third surface 426 may have a first angular spread φ1 and the second portion 490-2 of the illumination light 490 output at the second portion 426-2 of the third surface 426 may have a second angular spread φ2 that is different from the first angular spread φ1 (and additionally or alternatively, the first portion 490-1 and the second portion 490-2 of the illumination light 490 may have different principal directions). In such cases, the optical diffuser 432 may receive illumination light 490 (including portions 490-1 and 490-2 of the illumination light 490) propagating non-uniformly in a plurality of directions. The optical diffuser 432 diffuses the illumination light 490 output from the third surface 426 of the wedge waveguide 420 thereby providing diffused illumination light 492 that has a more uniform distribution compared to the illumination light 490 output from the third surface 426 of the wedge waveguide 420. The optical diffuser 432 may be, for example, a diffusive holographic optical element (HOE) or a diffusive polarization volume hologram (PVH).

In some embodiments, as shown in FIG. 4C, the optical assembly 430 includes an turning film 434 that is configured to redirect (e.g., refract, turn, direct) the illumination light 490 output from the third surface 426 of the wedge waveguide 420 by changing the direction of the illumination light 490 (e.g., by a predefined angle or predefined angles). As shown in inset B, the second portion 490-2 of the illumination light 490 output from the third surface 426 of the wedge waveguide 420 is redirected (e.g., turned, direction changed, refracted) by the turning film at an angle φ (e.g., a predefined angle).

In some embodiments, illumination light 490 output from the third surface 426 of the wedge waveguide 420 may be redirected by a same predefined angle across the surface of the turning film 434 (e.g., the first portion 490-1 and the second portion 490-2 of the illumination light 490 are redirected by a same angle). Alternatively, the first portion 490-1 of the illumination light 490 output from the third surface 426 of the wedge waveguide 420 may be redirected by a first angle (e.g., first predefined angle) and the second portion 490-2 of the illumination light 490 output from the third surface 426 of the wedge waveguide 420 may be redirected by a second angle (e.g., second predefined angle) that is different from the first predefined angle (e.g., the turning film 434 has non-uniform turn angles across the surface of the turning film 434 so that the first portion 490-1 of the illumination light 490 output from the first portion of the third surface 426 is redirected by the first angle and the second portion 490-2 of the illumination light 490 output from the second portion of the third surface 426 is redirected by the second angle).

In some embodiments, a turning film may include a plurality of prisms (e.g., facets) so that light incident upon a respective facet of a respective prism may be directed (e.g., refracted) in a different direction from the direction of incidence.

In some embodiments, as shown in FIG. 4D, the optical assembly 430 includes an holographic turning film 436 that is configured to change a direction (e.g., direct, redirect) of light incident on the holographic turning film 436 when an incident angle of the light incident on the holographic turning film 436 is within a predefined range 440 of incident angles. The holographic turning film 436 is also configured to transmit the light incident on the holographic turning film 436 without changing the direction of the light when the incident angle of the incident light is outside the predefined range 440 of incident angles.

In some embodiments, the wedge waveguide 420 is also configured to transmit ambient light. For example, the wedge waveguide 420 may be configured to receive ambient light 494 at the second surface 424 and transmit at least a portion of the ambient light 494 so that the transmitted portion of the ambient light 494 is output from the third surface 426 of the wedge waveguide 420.

For example, as shown in inset C of FIG. 4D, illumination light 490 (including first portion 490-1 and second portion 490-2 of illumination light 490) is incident upon the holographic turning film 436 at a first incident angle φ1 (e.g., 40 degrees) that is within the predefined range 440 of incident angles (e.g., an incident angle between 30 degrees and 50 degrees). Thus, the holographic turning film 436 changes a direction of the illumination light 490 by an angle φ (e.g., a predefined angle). In contrast, ambient light 494 is incident upon the holographic turning film 436 at a second incident angle φ2 (e.g., 0 degrees) that is outside the predefined range 440 of incident angles. Thus, the ambient light 494 is transmitted through the holographic turning film 436 without a change in direction.

In some embodiments, the holographic turning film 436 redirects the illumination light 490 by a same predefined angle across the surface of the holographic turning film 436. In some embodiments, the holographic turning film 436 redirects the illumination light 490 by different angles across the surface of the holographic turning film 436 (e.g., different portions of the holographic turning film 436 are configured to redirect the illumination light 490 by distinct angles).

In FIGS. 4C and 4D, the spatial light modulator 498 is not shown so as not to obscure other aspects of the display device 400. However, the display device 400 shown in FIGS. 4C and 4D may include the spatial light modulator 498 in some embodiments. In some other embodiments, the optical components shown in FIGS. 4C and 4D may be used independently (e.g., the wedge waveguide 420 may be used without the spatial light modulator 498).

FIGS. 5A-5B are schematic diagrams illustrating display device 400 in accordance with some embodiments. In FIGS. 5A and 5B, display device 400 also includes a spatial light modulator 510 positioned to receive the illumination light 490 output from the optical element (e.g., wedge waveguide 420). In some embodiments, the spatial light modulator 510 is integrated with the light source 410, wedge waveguide 420, and optical assembly 430 as part of display device 400. In some embodiments, the spatial light modulator 510 is located on a first side of the optical assembly 430 (e.g., the right side of the optical assembly 430 in FIG. 5A) and the wedge waveguide 420 is located on a second side of the optical assembly 430 (e.g., the left side of the optical assembly 430 in FIG. 5A) opposite to the first side of the optical assembly 430.

In some embodiments, the light source 410 includes a plurality of light emitting elements and each element is individually activatable. FIGS. 5A and 5B illustrate a light source that includes a plurality of light emitting elements 530-1 through 530-10, and each light emitting element can be activated to output illumination light 490 or deactivated so that light is not output from the light emitting element. For example, as shown in FIGS. 5A and 5B, light emitting elements 530-1 and 530-2 are activated to output a first portion 590-1 of illumination light 490, light emitting elements 530-7 and 530-8 are activated to output a second portion 590-2 of illumination light 490, light emitting elements 530-9 and 530-10 are activated to output a third portion 590-3 of illumination light 490, and light emitting elements 530-3 through 530-6 are deactivated so that illumination light is not provided by light emitting elements 530-3 through 530-6. Deactivating light emitting elements 530 for the regions of the spatial light modulator 510 that are not selected for providing image light reduces energy required to operate the light source 410, which in turn, improves the efficiency of the display device 500. In addition, deactivating light emitting elements 530 for the regions of the spatial light modulator 510 that are not selected for providing image light increases the contrast, thereby improving the quality of the image projected by the spatial light modulator 510.

Respective portions of the illumination light 490 are output at respective portions of the third surface 426 or the wedge waveguide 420 and transmitted to respective pixels or a group of pixels of the spatial light modulator 510. For example, as shown in FIGS. 5A and 5B, the first portion 590-1 of illumination light 590 is transmitted to a first pixel or a first group of pixels 510-1, the second portion 590-2 of illumination light 590 is transmitted to a second pixel or a second group of pixels 510-2, and the third portion 590-3 of illumination light 590 is transmitted to a third pixel or a third group of pixels 510-5, and the illumination light 590 is not provided to (e.g., not incident upon, does not impinge upon, not transmitted to) the pixels or a group of pixels 510-3 and 510-4.

In some embodiments, the spatial light modulator 510 includes a layer of optically anisotropic molecules (e.g., liquid crystals) that can be configured to modulate an amplitude or phase of light incident upon the spatial light modulator 510. Additionally, the spatial light modulator 510 may include one or more transistors and an optically transparent electrode so that an electric field applied to a respective portion of the layer of optically anisotropic molecules (e.g., corresponding to a pixel or a group of pixels) can be individually controlled. In some embodiments, the one or more transistors are integrated with a substrate that may include a silicon substrate and/or a printed circuit board (PCB). In some embodiments, the one or more transistors may be a metal-oxide-semiconductor field-effect transistor (e.g., MOSFET). In some embodiments, the transistors are arranged in a complementary metal-oxide-semiconductor (e.g., CMOS) configuration.

The layer of optically anisotropic molecules is disposed between the optically transparent electrode and the one or more transistors. Each transistor of the one or more transistors defines a pixel and a respective transistor is configured to control a state of a respective pixel. This configuration allows polarization modulation. For example, the respective pixel of the plurality of pixels may provide the first light having the same polarization as the illumination light while the respective pixel (or a corresponding transistor) is in the first state and provide the second light having a polarization different from (e.g., orthogonal to) the polarization of the illumination light while the respective pixel (or the corresponding transistor) is the second state. Thus, in some embodiments, a respective pixel of the plurality of pixels is individually activatable. For example, the respective pixel of the plurality of pixels may be activated or deactivated independent of whether the rest of the plurality of pixels are activated or deactivated. Similarly, a respective transistor of the plurality of transistors may be individually activatable.

In some embodiments, an electrical signal applied at each pixel is individually controllable via the one or more transistors. For example, a respective pixel is in the first state when a respective transistor allows an electrical signal to be applied at a respective pixel so that optically anisotropic molecules in a portion of the layer of optically anisotropic molecules that are located adjacent to the respective transistor have a first orientation, and the respective pixel is in the second state when the respective transistor does not allow an electrical signal to reach the respective pixel so that the optically anisotropic molecules in the portion of the layer of optically anisotropic molecules that is located adjacent to the respective transistor have a second orientation that is different from the first orientation, or vice versa. For example, as shown in FIG. 5B, pixel 510-1 is in a first state and pixel 510-2 is in the second state. An electrical signal is applied (e.g., "on") at pixel 510-1, and optically anisotropic molecules (e.g., liquid crystals) that are in a first portion of the layer of optically anisotropic molecules, located adjacent to a first transistor and corresponding to pixel 510-1, have a first orientation. An electrical signal is not applied (e.g., "off") at pixel 510-2, and optically anisotropic molecules that are in a second portion of the layer of optically anisotropic molecules that is located adjacent to a second transistor and corresponding to pixel 510-4, have a second orientation that is different from the first orientation (e.g., in some cases, the second orientation is orthogonal to the first orientation, and in some cases, the second orientation represents a random orientation so that the liquid crystals do not alter the polarization of the transmitted light). In some embodiments, the first transistor may be connected to a different electrical source (e.g., voltage or current source) than the second transistor. Alternatively, the first transistor and the second transistor may be connected in parallel to a same electrical source. Thus, the first portion 590-1 of the illumination light, transmitted to the pixel 510-1 in the first state, is allowed to be transmitted through and output from pixel 510-1. In contrast, the second portion 590-2 the illumination light, transmitted to the pixel 510-4 in the second state, is blocked from being transmitted through and output from pixel 510-4. In some embodiments, the spatial light modulator 510 includes, or is coupled with, a polarizer to transmit light having a certain polarization (e.g., a first polarization) and block light having an orthogonal polarization (e.g., a second polarization orthogonal to the first polarization).

Figure 5C:
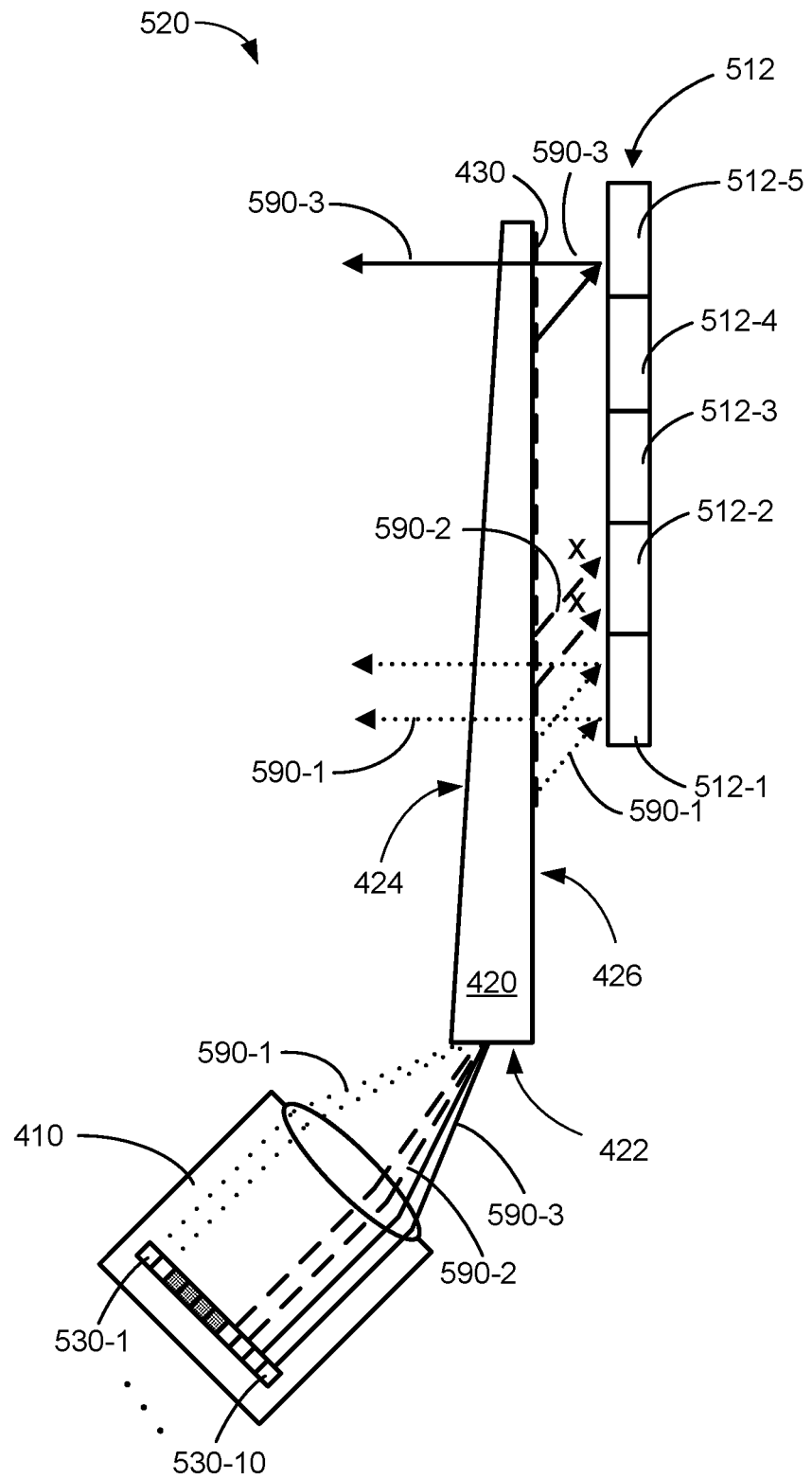
FIG. 5C is a schematic diagram illustrating a display device including a reflective spatial light modulator in accordance with some embodiments.

FIG. 5C is a schematic diagram illustrating a display device 520 including a reflective spatial light modulator 512 in accordance with some embodiments. The display device 520 is similar to the display device 500 described with respect to FIGS. 5A and 5B except that the display device 520 includes the reflective spatial light modulator 512 instead of the spatial light modulator 510 (e.g., a transmissive spatial light modulator). In some embodiments, image light from the spatial light modulator 512 is transmitted through the wedge waveguide 420 as shown in FIG. 5C (which may be subsequently directed toward an eye of a user).

Figure 6B:
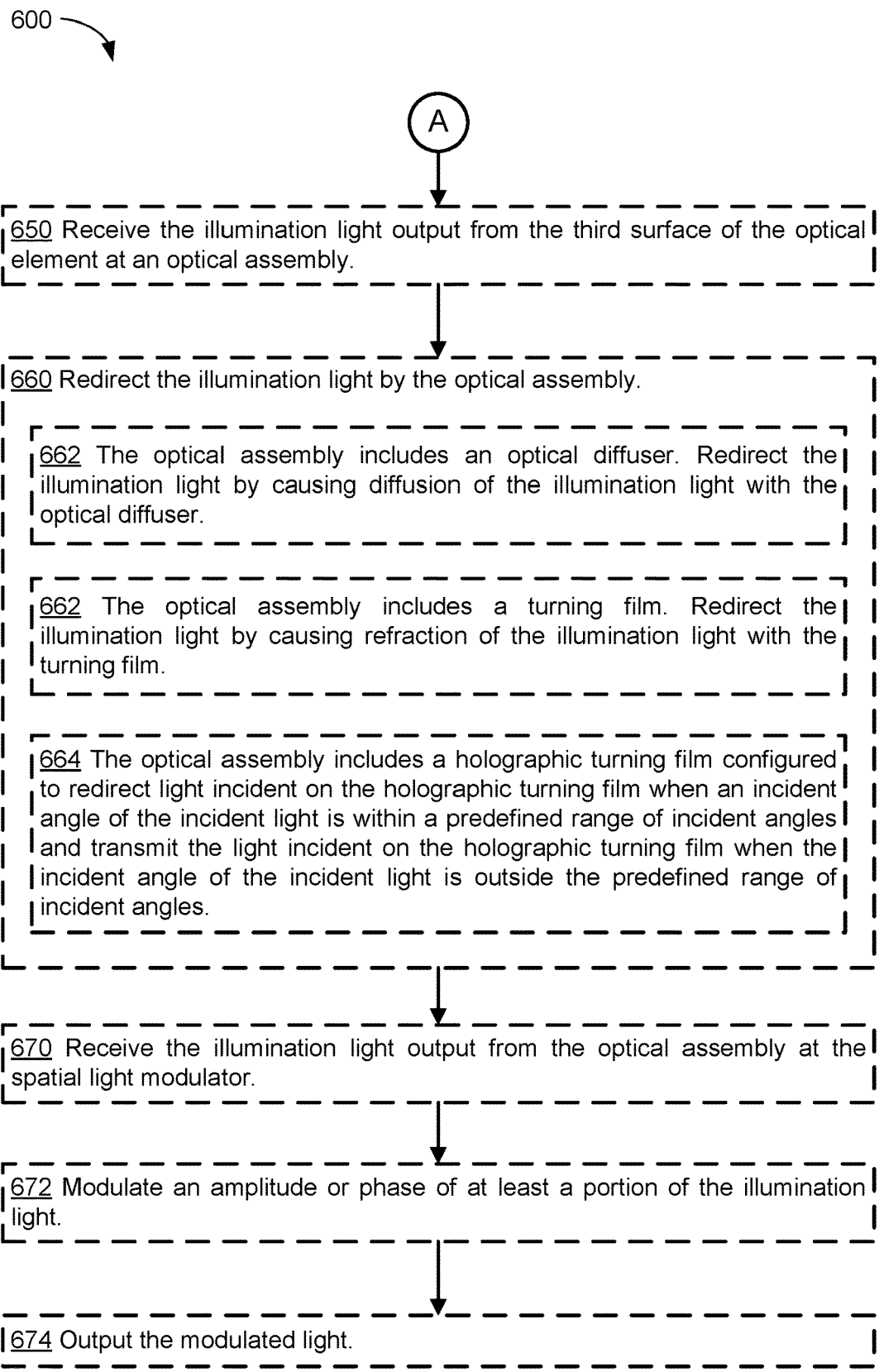

FIGS. 6A-6B illustrate a flow diagram illustrating a method 600 in accordance with some embodiments. The method 600 includes (operation 610) providing illumination light (including portions 590-1 through 590-3 of illumination light 590) from a light source (e.g., light source 410), and (operation 620) receiving the illumination light at a first surface of an optical element (e.g., the first surface 422 of the wedge waveguide 420). The optical element (e.g., wedge waveguide 420) also includes a second surface (e.g., second surface 424) that is distinct from and non-parallel to the first surface, and a third surface (e.g., third surface 426) that is distinct from and non-parallel to the first surface and the second surface. The method 600 also includes (operation 630) propagating the illumination light in the optical element via total internal reflection (TIR) (e.g., propagation of illumination light 490 within the wedge waveguide 420 as shown in FIG. 4B), and (operation 640) outputting the illumination light 490 from the third surface of the optical element (e.g., the third surface 426 of the wedge waveguide 420) for illuminating a spatial light modulator (e.g., the spatial light modulator 510).

In some embodiments, the light source includes a plurality of light emitting elements (e.g., the light source 410 in FIG. 5A includes light emitting elements 530-1 through 530-10) and the method 600 includes (operation 612) activating a subset, less than all, of the plurality of light emitting elements (e.g., activating light emitting elements 530-1 and 530-2 and 530-7 through 530-10 while light emitting elements 530-3 through 530-6 are not activated).

In some embodiments, the method 600 further includes (operation 650) receiving the illumination light 490 output from the third surface 426 of the optical element at an optical assembly (e.g., optical assembly 430 receives the illumination light 490 output from the third surface 426 of the optical element 430), and (operation 660) redirecting the illumination light by the optical assembly (the illumination light 490 is redirected by the optical assembly 430 as shown in FIGS. 4B-4D). In some embodiments, the optical assembly includes an optical diffuser (e.g., an optical diffuser 432 shown in FIG. 4B) and redirecting the illumination light includes (operation 662) causing diffusion of the illumination light with the optical diffuser (e.g., the illumination light 490 is diffused by the optical diffuser 432). In some embodiments, the optical assembly includes a turning film (e.g., turning film 434 shown in FIG. 4C) and redirecting the illumination light 490 includes (operation 664) refracting the illumination light with the turning film (e.g., the illumination light 490 is refracted by the turning film 434). In some embodiments, the optical assembly includes a holographic turning film (e.g., holographic turning film 436 shown in FIG. 4D) configured to redirect light incident on the holographic turning film when an incident angle of the incident light is within a predefined range of incident angles and transmit the light incident on the holographic turning film when the incident angle of the incident light is outside the predefined range of incident angles (e.g., the holographic turning film 436 redirects light incident on the holographic turning film 436 when an incident angle of the incident light is within a predefined range 440 of incident angles and transmit the light incident on the holographic turning film 436 when the incident angle of the incident light is outside the predefined range 440 of incident angles as shown in FIG. 4D).

In some embodiments, the method 600 also includes (operation 670) receiving the illumination light output from the optical assembly at the spatial light modulator (e.g., the spatial light modulator 510 receives the illumination light 590 output from the optical assembly 430), (operation 672) modulating an amplitude or phase of at least a portion of the illumination light (e.g., the spatial light modulator 510 modifies the amplitude or phase of at least a portion of the illumination light 590 as shown in FIG. 5B), and (operation 674) outputting the modulated light (e.g., the spatial light modulator 510 outputs the modulated light).

In light of these principles, we now turn to certain embodiments of display devices.

In accordance with some embodiments, a display device (e.g., display device 400) for illuminating a spatial light modulator (e.g., spatial light modulator 498) includes a light source (e.g., light source 410) and an optical element (e.g., wedge waveguide 420). The light source is configured to provide illumination light (e.g., illumination light 490). The optical element has a first surface (e.g., first surface 422), a second surface (e.g., second surface 424) distinct from and non-parallel to the first surface, and a third surface (e.g., third surface 426) distinct from and non-parallel to the first surface and the second surface. The optical element is configured to receive, at the first surface, the illumination light provided by the light source, propagate the illumination light via total internal reflection, and output the illumination light from the third surface.

In some embodiments, the optical element (e.g., wedge waveguide 420) is a wedge waveguide.

In some embodiments, the first surface (e.g., first surface 422) is a planar surface. In some embodiments, the second surface (e.g., second surface 424) is a planar surface. In some embodiments, the third surface (e.g., third surface 426) is a planar surface. In some embodiments, the second surface is separate from (e.g., not in contact with) the third surface. In some embodiments, the optical element (e.g., wedge waveguide 420) includes a fourth surface (e.g., fourth surface 428) that is distinct from the first surface, the second surface, and the third surface and non-parallel to the second surface and the third surface, and the fourth surface adjoins the second surface and the third surface.

In some embodiments, the second surface (e.g., second surface 424) and the first surface (e.g., first surface 422) form a first angle (e.g., first angle $\theta 1$), and the third surface (e.g., third surface 426) and the first surface form a second angle (e.g., second angle $\theta 2$) that is distinct from the first angle so that a first portion (e.g., first portion 490-1) of the illumination light (e.g., illumination light 490) is output from a first portion (e.g., first portion 426-1) of the third surface and a second portion (e.g., second portion 490-2) of the illumination light, mutually exclusive to the first portion of the illumination light, is output from a second portion (e.g., second portion 426-2) of the third surface that is mutually exclusive to the first portion of the third surface. In some embodiments, the first angle and the second angle are identical (e.g., the optical element is an isosceles triangular prism or an isosceles trapezoidal prism).

In some embodiments, the display device (e.g., display device 400) also includes a spatial light modulator (e.g., spatial light modulator 498) positioned to receive the illumination light (e.g., illumination light 490) output from the optical element (e.g., wedge waveguide 420). In some embodiments, the spatial light modulator is configured to modulate an amplitude or phase of at least a portion of the illumination light and output modulated light.

In some embodiments, the display device (e.g., display device 400) also includes an optical assembly (e.g., optical assembly 430) disposed adjacent to the third surface (e.g., third surface 426) of the optical element (e.g., wedge waveguide 420). The optical assembly is configured to receive the illumination light (e.g., illumination light 490) output from the third surface and redirect (e.g., direct or change a direction of) the illumination light.

In some embodiments, the optical assembly (e.g., optical assembly 430) is disposed on the third surface (e.g., third surface 426) of the optical element (e.g., wedge waveguide 420). For example, the optical assembly is in contact with the third surface of the optical element.

In some embodiments, the optical assembly (e.g., optical assembly 430) is spaced apart from the third surface (e.g., third surface 426) of the optical element (e.g., wedge waveguide 420).

In some embodiments, the optical assembly (e.g., optical assembly 430) includes an optical diffuser (e.g., optical diffuser 432) configured to diffuse the illumination light (e.g., illumination light 490) output from the third surface (e.g., third surface 426) of the optical element (e.g., wedge waveguide 420), thereby providing diffused illumination light (e.g., FIG. 4B). In some embodiments, the optical diffuser is a polarization volume hologram or a diffusive holographic optical element.

In some embodiments, the optical assembly (e.g., optical assembly 430) includes a turning film (e.g., turning film 434) configured to redirect the illumination light (e.g., illumination light 490) output from the third surface (e.g., third surface 426) of the optical element (e.g., wedge waveguide 420) by changing the direction of the illumination light (e.g., by a predefined angle or predefined angles).

In some embodiments, the optical assembly (e.g., optical assembly 430) includes a holographic turning film (e.g., holographic turning film 436 shown in FIG. 4D) that is configured to change a direction (e.g., direct, redirect) of light incident on the holographic turning film when an incident angle of the incident light is within a predefined range of incident angles (e.g., range 440), and to transmit the light incident on the holographic turning film without changing the direction of the light when the incident angle of the incident light is outside the predefined range of incident angles. At least a portion of the illumination light (e.g., illumination light 490) impinges on the holographic turning film at an incident angle within the predefined range of incident angles.

In some embodiments, ambient light (e.g., ambient light 494) impinges on the holographic turning film at an incident angle (e.g., incident angle φ2) outside the predefined range of incident angles.

In some embodiments, the optical element (e.g., wedge waveguide 420) receives the ambient light (e.g., ambient light 494) on the second surface (e.g., second surface 424) and outputs the ambient light from the third surface (e.g., third surface 426). In some embodiments, the spatial light modulator (e.g., spatial light modulator 510) receives the ambient light output from the optical assembly (e.g., optical assembly 430), and transmits at least a portion of the ambient light.

In some embodiments, the light source (e.g., light source 410) includes a plurality of light emitting elements (e.g., light emitting elements 530-1 through 530-10 shown in FIG. 5A), and each light emitting element is individually activatable.

In accordance with some embodiments, a method (e.g., method 600) includes (operation 610) providing illumination light (e.g., illumination light 490) from a light source (e.g., light source 410), and (operation 620) receiving the illumination light provided by the light source at a first surface (e.g., first surface 422) of an optical element (e.g., wedge waveguide 420). The optical element also has a second surface (e.g., second surface 424) that is distinct from and non-parallel to the first surface, and a third surface (e.g., third surface 426) that is distinct from and non-parallel to the first surface and the second surface. The method further includes (operation 630) propagating the illumination light via total internal reflection in the optical element, and (operation 640) outputting the illumination light from the third surface of the optical element for illuminating the spatial light modulator (e.g., spatial light modulator 510).

In some embodiments, the optical element (e.g., wedge waveguide 420) is a wedge waveguide.

In some embodiments, the method (e.g., method 600) further includes (operation 650) receiving the illumination light output from the third surface of the optical element at an optical assembly, and (operation 660) redirecting (e.g., direct, change a direction) the illumination light (e.g., illumination light 490) by the optical assembly (e.g., optical assembly 430).

In some embodiments, the optical assembly (e.g., optical assembly 430) includes an optical diffuser (e.g., optical diffuser 432), and the method (e.g., method 600) further includes (operation 662) redirecting (e.g., directing, changing a direction of) the illumination light (e.g., illumination light 490) includes causing diffusion of the illumination light with the optical diffuser.

In some embodiments, the optical assembly (e.g., optical assembly 430) includes a turning film (e.g., turning film 434), and the method (e.g., method 600) further includes (operation 664) redirecting (e.g., directing, changing a direction of) the illumination light (e.g., illumination light 490) includes causing refraction of the illumination light with the turning film.

In some embodiments, the optical assembly (e.g., optical assembly 430) includes a holographic turning film (e.g., holographic turning film 436) that is configured to redirect (e.g., direct, change a direction) light incident on the holographic turning film when an incident angle of the incident light is within a predefined range of incident angles, and to transmit the light incident on the holographic turning film when the incident angle of the incident light is outside the predefined range of incident angles.

In some embodiments, the method (e.g., method 600) further includes (operation 670) receiving the illumination light (e.g., illumination light 490) output from the optical assembly (e.g., optical assembly 430) at the spatial light modulator (e.g., spatial light modulator 510), (operation 672) modulating an amplitude or phase of at least a portion of the illumination light (e.g., illumination light 490), and (operation 674) outputting the modulated light.

In some embodiments, the light source (e.g., light source 410) includes a plurality of light emitting elements (e.g., light emitting elements 530-1 through 530-10), and the method (e.g., method 600) also includes (operation 612) activating a subset, less than all, of the plurality of light emitting elements.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
   a light source configured to provide illumination light;
   an optical element having a first surface, a second surface distinct from and non-parallel to the first surface, and a third surface distinct from and non-parallel to the first surface and the second surface, wherein the optical element is configured to:
   receive, at the first surface, the illumination light provided by the light source;
   propagate the illumination light via total internal reflection; and
   output the illumination light from the third surface;
   an optical assembly disposed adjacent to the third surface of the optical element, wherein the optical assembly is configured to receive the illumination light output from the third surface and redirect the illumination light, wherein the optical assembly includes an optical diffuser configured to diffuse the illumination light output from the third surface of the optical element, thereby providing diffused illumination light; and
   a reflective spatial light modulator positioned to receive the illumination light and reflect at least a portion of the received illumination light back as image light so that the image light is transmitted through the optical element from the third surface of the optical element to the second surface of the optical element and is output from the second surface of the optical element.

2. The optical device of claim 1, wherein the optical assembly includes a turning film configured to redirect the illumination light output from the third surface of the optical element by changing the direction of the illumination light.

3. The optical device of claim 1, wherein the optical element is a wedge waveguide.

4. The optical device of claim 1, wherein the second surface is a planar surface and the third surface is a planar surface.

5. The optical device of claim 1, wherein:
the second surface and the first surface form a first angle, and the third surface and the first surface form a second angle distinct from the first angle.

6. The optical device of claim 1, wherein the optical assembly is disposed on the third surface of the optical element.

7. An optical device, comprising:
a light source configured to provide illumination light;
an optical element having a first surface, a second surface distinct from and non-parallel to the first surface, and a third surface distinct from and non-parallel to the first surface and the second surface, wherein the optical element is configured to:
 receive, at the first surface, the illumination light provided by the light source;
 propagate the illumination light via total internal reflection; and
 output the illumination light from the third surface;
an optical assembly disposed adjacent to the third surface of the optical element, wherein the optical assembly is configured to receive the illumination light output from the third surface and redirect the illumination light, wherein:
 the optical assembly includes a holographic turning film configured to:
  change a direction of light incident on the holographic turning film when an incident angle of the incident light is within a predefined range of incident angles; and
  transmit the light incident on the holographic turning film when the incident angle of the incident light is outside the predefined range of incident angles; and
 at least a portion of the illumination light impinges on the holographic turning film at an incident angle within the predefined range of incident angles; and
a reflective spatial light modulator positioned to receive the illumination light and reflect at least a portion of the received illumination light back as image light so that the image light is transmitted through the optical element from the third surface of the optical element to the second surface of the optical element and is output from the second surface of the optical element.

8. The optical device of claim 7, wherein the optical assembly is spaced apart from the third surface of the optical element.

9. The optical device of claim 7, wherein:
the light source includes a plurality of light emitting elements, each light emitting element being individually activatable.

10. A method, comprising:
providing, from a light source, illumination light;
receiving the illumination light provided by the light source at a first surface of an optical element having a second surface that is distinct from and non-parallel to the first surface and a third surface that is distinct from and non-parallel to the first surface and the second surface;
propagating, in the optical element, the illumination light via total internal reflection;
outputting, from the third surface of the optical element, the illumination light for illuminating a spatial light modulator;
receiving, at an optical assembly, the illumination light output from the third surface of the optical element, wherein the optical assembly includes an optical diffuser;
redirecting, by the optical assembly, the illumination light, wherein redirecting the illumination light includes causing diffusion of the illumination light with the optical diffuser; and
receiving, at a reflective spatial light modulator, the illumination light and reflecting at least a portion of the received illumination light back as image light so that the image light is transmitted through the optical element from the third surface of the optical element to the second surface of the optical element and is output from the second surface of the optical element.

11. The method of claim 10, wherein:
the optical assembly includes a turning film; and
redirecting the illumination light includes causing refraction of the illumination light with the turning film.

12. The method of claim 10, wherein:
the optical assembly includes a holographic turning film configured to redirect light incident on the holographic turning film when an incident angle of the incident light is within a predefined range of incident angles and transmit the light incident on the holographic turning film when the incident angle of the incident light is outside the predefined range of incident angles.

13. The method of claim 10, further comprising:
receiving the illumination light at the reflective spatial light modulator;
modulating an amplitude or phase of at least a portion of the illumination light; and
outputting the modulated light as the image light.

14. The method of claim 10, wherein:
the light source includes a plurality of light emitting elements; and
the method also includes activating a subset, less than all, of the plurality of light emitting elements.

15. The optical device of claim 7, wherein the second surface is a planar surface and the third surface is a planar surface.

16. The method of claim 10, wherein the optical assembly is disposed on the third surface of the optical element.

17. The method of claim 10, wherein the second surface is a planar surface and the third surface is a planar surface.

18. The method of claim 10, wherein the optical element is a wedge waveguide.

* * * * *